United States Patent
Xue et al.

(10) Patent No.: US 6,782,414 B1
(45) Date of Patent: Aug. 24, 2004

(54) METHOD AND SYSTEM FOR DETERMINATION OF DELIVERY STATUS OF EMAIL SENT TO MULTIPLE RECIPIENTS THROUGH MULTIPLE PROTOCOLS

(75) Inventors: Xinjian Xue, Noblesville, IN (US); Bradley J. Graves, Noblesville, IN (US); Michael G. Morey, Indianapolis, IN (US); Gregory M. Risk, W. Lafayette, IN (US); Douglas G. Hobson, Indianapolis, IN (US); Amy S. Aldridge, Indianapolis, IN (US); Richard S. Taylor, Indianapolis, IN (US)

(73) Assignee: International Business Machines Corporation, Armonk, NY (US)

(*) Notice: Subject to any disclaimer, the term of this patent is extended or adjusted under 35 U.S.C. 154(b) by 622 days.

(21) Appl. No.: 09/631,713

(22) Filed: Aug. 3, 2000

(51) Int. Cl.[7] .................. G06F 15/16; G06F 13/00; G06F 11/00
(52) U.S. Cl. .................. 709/206; 709/201; 709/246; 714/48; 719/318
(58) Field of Search .................. 709/206, 207, 709/201, 202, 203, 204, 224, 236, 246; 714/48; 719/318

(56) References Cited

U.S. PATENT DOCUMENTS

| 5,396,537 A | | 3/1995 | Schwendeman ............ 379/57 |
| 5,504,897 A | * | 4/1996 | Gans et al. |
| 5,633,916 A | | 5/1997 | Goldhagen et al. ............ 379/67 |
| 5,675,733 A | | 10/1997 | Williams ............... 395/200.01 |
| 5,699,412 A | | 12/1997 | Polcyn ........................ 379/89 |
| 5,878,230 A | | 3/1999 | Weber et al. .......... 395/200.68 |
| 5,930,471 A | | 7/1999 | Milewski et al. ...... 395/200.04 |
| 6,163,809 A | * | 12/2000 | Buckley |
| 6,438,583 B1 | * | 8/2002 | McDowell et al. |
| 6,449,640 B1 | * | 9/2002 | Haverstock et al. |
| 6,532,230 B1 | * | 3/2003 | Lung et al. |
| 6,584,466 B1 | * | 6/2003 | Serbinis et al. |
| 6,609,156 B1 | * | 8/2003 | Magolan et al. |

FOREIGN PATENT DOCUMENTS

| GB | 2327172 A | 1/1999 |
| WO | WO 98/06049 | 2/1998 |

* cited by examiner

Primary Examiner—Paul Kang
(74) Attorney, Agent, or Firm—Jeffrey S. LaBaw; Joseph R. Burwell (57) ABSTRACT

A method, system, and computer program product is provided for the determination of a single delivery status of a message sent to multiple recipients which also allows the message to be transmitted or transferred through multiple message protocols, such as Extended Simple Message Transfer Protocol (ESMTP), Messaging Application Programming Interface (MAPI), and Vendor Independent Messaging (VIM). A sender generates an original message that is intended to be sent to multiple recipients. When a delivery status notification is received from a recipient, the delivery status notification contains a protocol-specific delivery status code. The protocol-specific status codes of multiple messaging protocols are mapped to a protocol-neutral set of status codes that can be commonly applied to any given messaging protocol. An overall protocol-neutral delivery status code for the original message can be computed based upon protocol-neutral status codes for a plurality of delivery status notifications received from a plurality of recipients of the original message. An envelope identifier can be associated with the original message to facilitate tracking and reconciliation of delivery status notifications. A time-out period for receipt of delivery status notifications can be associated with the original message.

36 Claims, 10 Drawing Sheets

EXAMPLE OF A POSSIBLE MAPPING OF PROTOCOL-SPECIFIC STATUS CODES TO A PROTOCOL-NEUTRAL STATUS CODE

| | STATUS CODE | | |
|---|---|---|---|
| PROTOCOL-NEUTRAL | SUCCESS | PENDING | FAILURE |
| ESMTP | 2.x.x | 4.x.x | 5.x.x |
| MAPI | "recipient_name has read this message" | If no reply | N/A |
| VIM | delivered | If no reply | failure |

FIG. 1A
(PRIOR ART)

Format of SMTP "MAIL" command:

MAIL FROM: sender_address RET=return_contents ENVID=envelope_id

FIG. 2A

Possible values for "return_content" parameter:

return_contents = { FULL, HDRS

Format of envelope ID:

random_numberDAY-MMM-DD-HH:MM:SS-YYYY-Magellan100-sender_address

*FIG. 2C*

Example of valid envelope ID:

5969Fri-Feb-19-13:51:34-1999-Magellan100-jsmith@machineX.tivoli.com

*FIG. 2D*

Format of SMTP "RCPT" command:

RCPT TO: recipient_address NOTIFY=notifier ORCPT=RFC822; recipient_address

*FIG. 2E*

Possible values for "notifier" parameter $$\text{notifier} = \begin{cases} \text{NEVER} \\ \text{SUCCESS, DELAY, FAILURE} \end{cases}$$

*FIG. 2F*

Example of delivery notification in ESMTP:
Original-Envelope-Id: 5969Fri-Feb-19-13:51:34-1999-Magellan100-hjones@machineX.tivoli.com
Reporting-MTA: dns; machineX.tivoli.com
Received-From-MTA: DNS; HJONES.machineX.tivoli.com
Arrival-Date: Fri, 19 Feb 1999 13:58:12 -0500 (EST)

Original-Recipient: RFC822;hjones@machineX.tivoli.com
Final-Recipient: RFC822; hjones@machineX.tivoli.com
Action: delivered (to mailbox)
Status: 2.1.5
Last-Attempt-Date: Fri, 19 Feb 1999 13:58:12 -0500 (EST)

EXAMPLES OF PROTOCOL-SPECIFIC STATUS CODES

| PROTOCOL | STATUS VARIABLE | STATUS CODE |
|---|---|---|
| ESMTP | Delivery_status | "2.x.x (success)", "4.x.x (delayed)", "5.x.x (failure)" |
| MAPI | Return_receipt | "recipient_name has read this message." |
| VIM | Delivery_report | "delivered", "delivery_path", "failure" |

FIG. 4

EXAMPLE OF A POSSIBLE MAPPING OF PROTOCOL-SPECIFIC
STATUS CODES TO A PROTOCOL-NEUTRAL STATUS CODE

| | STATUS CODE | | |
|---|---|---|---|
| PROTOCOL-NEUTRAL | SUCCESS | PENDING | FAILURE |
| ESMTP | 2.x.x | 4.x.x | 5.x.x |
| MAPI | "recipient_name has read this message" | If no reply | N/A |
| VIM | delivered | If no reply | failure |

METHOD AND SYSTEM FOR DETERMINATION OF DELIVERY STATUS OF EMAIL SENT TO MULTIPLE RECIPIENTS THROUGH MULTIPLE PROTOCOLS

BACKGROUND OF THE INVENTION

1. Field of the Invention

The present invention relates to an improved data processing system and, in particular, to a method and apparatus for multicomputer data transferring. Still more particularly, the present invention provides a method and apparatus for a computer-to-computer message system.

2. Description of Related Art

The development of computer networks and the ability for digital communication between data processing systems has enabled new forms of communication, such as the transmission of documents by facsimile and electronic mail. Electronic mail, or e-mail, is merely the transmission of a digitally encoded file from one data processing system to another data processing system, with storage provided at one or both ends of the transmission system. It is common for a data processing system to automatically alert a recipient of an incoming e-mail message, and the recipient may subsequently view the message, print the message, respond to the message, forward the message, etc. Depending upon the types of data contained in the e-mail message, the contents of the message may be presented in a variety of manners, including replay of video data and/or audio data. As used herein, the term "electronic mail" or "e-mail" encompasses all types of digital files that can be sent between data processing systems based upon digital network addresses of either users, systems, networks, devices, etc., regardless of the type of transmission protocol that is used to support the data containing the message content across one or more transmission media.

Because of the wide variety of content types that may be transmitted in this manner, e-mail has become extremely popular, and the number of e-mail messages continues to grow at an accelerating rate. E-mail has become an effective tool that easily allows the dissemination of information, whether in a business or organizational management context or in a personal context. Within these different types of contexts, it is now common to manage address lists of persons or organizations to be contacted through e-mail when the need arises for quick dissemination of particular types information. In fact, a person generally manages multiple address lists in which each address list pertains to a particular function, purpose, type of information, etc.

These address lists facilitate the transmission of e-mail messages to a plurality of addresses, and an address list may be arbitrarily large. As a consequence, a single e-mail file may be disseminated as a large number of copies of the original e-mail file in correlation with the number of addresses within a particular e-mail recipient list. Although the recipient list for an e-mail message may be as small as a single address, the recipient list may contain a large number of addresses conglomerated from more than one address list.

An e-mail address provides a sender with a standard identifier for a recipient that is relatively easy to remember; the recipient is not required to know the recipient's type of message delivery system nor its supported message protocols. While knowing transmission-enabling information about a single recipient's message delivery system might have been acceptable many years ago, it is not practical to require anyone to know such information about all persons on multiple address lists. For example, several message transmission protocol standards exist, but a sender is typically relieved of dealing with these standards; once a message is addressed, most message systems deliver the message by negotiating the transfer of the message in the appropriate message transmission protocol in a manner that is transparent to the sender of the message.

In order to assist message originators in tracking the dispersion of messages, many message systems provide the ability to automatically generate a message acknowledgment, sometimes termed a "message return receipt" or a "delivery status notification". When a data processing system sends a message to another data processing system, the receiving system may automatically generate an acknowledgment of its receipt. In general, the receiving system sends to the transmitting system a unique message, which contains some type of identifying information for allowing the transmitting system to correlate the incoming receipt message with the originally transmitted message. The transmitting system may subsequently notify the sender that the message was received at the receiving system and/or perform various accounting duties relating to the original message.

These acknowledgment messages are individually generated upon receipt of each copy of the original message at each destination address specified in the original message. If the sender uses a large number of destination addresses in the original message, which is quite easy to do through the use of address lists, then the number of return receipts can easily become quite large. It can be become quite difficult to manage and track large numbers of message acknowledgments.

In addition to reconciling multiple acknowledgments for a single message, some message delivery protocols provide multiple status,types for delivery notification. Hence, a single original message may consequently receive a plurality of return receipts with a variety of delivery statuses. At any given point in time, a user may have many active or outstanding messages for which he or she is anticipating return receipts. It may be quite difficult for the originator of a message to accept multiple return receipts for several original messages, reconcile the return receipts with their originating message, and determine the extent to which an original message was successfully delivered to its intended recipients.

Therefore, it would be advantageous to provide a method and system for the determination of a single delivery status of a message sent to multiple recipients. It would be particularly advantageous to provide a methodology that allows the message to be transmitted or transferred through multiple message protocols.

SUMMARY OF THE INVENTION

The present invention is a method, system, apparatus, or computer program product for the determination of a single delivery status of a message sent to multiple recipients which also allows the message to be transmitted or transferred through multiple message protocols, such as Extended Simple Message Transfer Protocol (ESMTP), Messaging Application Programming Interface (MAPI), and Vendor Independent Messaging (VIM). A sender generates an original message that is intended to be sent to multiple recipients. When a delivery status notification is received from a recipient, the delivery status notification contains a protocol-specific delivery status code. The protocol-specific status codes of multiple messaging protocols are mapped to a protocol-neutral set of status codes that can be commonly applied to any given messaging protocol. An overall protocol-neutral delivery status code for the original message can be computed based upon protocol-neutral status codes for a plurality of delivery status notifications received from a plurality of recipients of the original message. An envelope identifier can be associated with the original message to facilitate tracking and reconciliation of delivery status notifications. A time-out period for receipt of delivery status notifications can be associated with the original message.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1A:
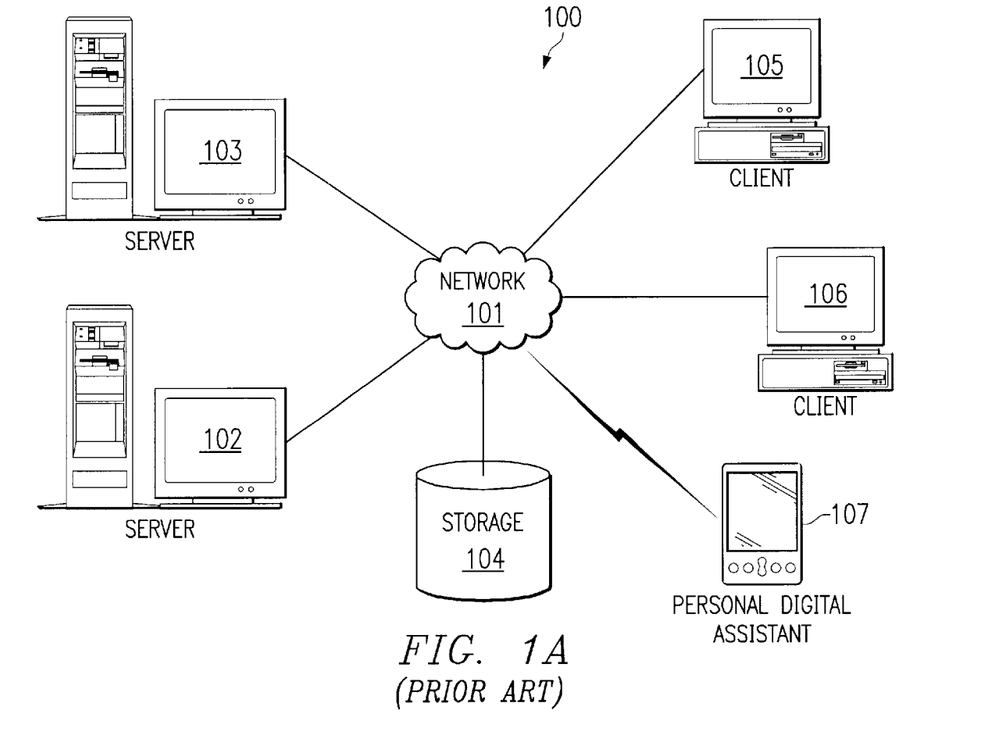
FIG. 1A depicts a prior art distributed data processing system in which the present invention may be implemented.

With reference now to the figures, FIG. 1A depicts a typical distributed data processing system in which the present invention may be implemented. Distributed data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 may be a variety of computing devices, such as personal computers, personal digital assistants (PDAs), etc. Distributed data processing system 100 may include additional servers, clients, and other devices not shown. In the depicted example, distributed data processing system 100 may include the Internet with network 101 representing a worldwide collection of networks and gateways that use the TCP/IP suite of protocols to communicate with one another. Of course, distributed data processing system 100 also may be configured to include a number of different types of networks, such as, for example, an intranet, a local area network (LAN), or a wide area network (WAN).

FIG. 1A is intended as an example of a heterogeneous computing environment and not as an architectural limitation for the present invention. The present invention could be implemented on a variety of hardware platforms, such as server 102 or client 107 shown in FIG. 1A. The client machines comprise a user interface for allowing a user to interact with a data processing system through various types of input devices. A user may author a message at one device and send the message to another device or to another user expected to be accessing a particular device.

Figure 1B:
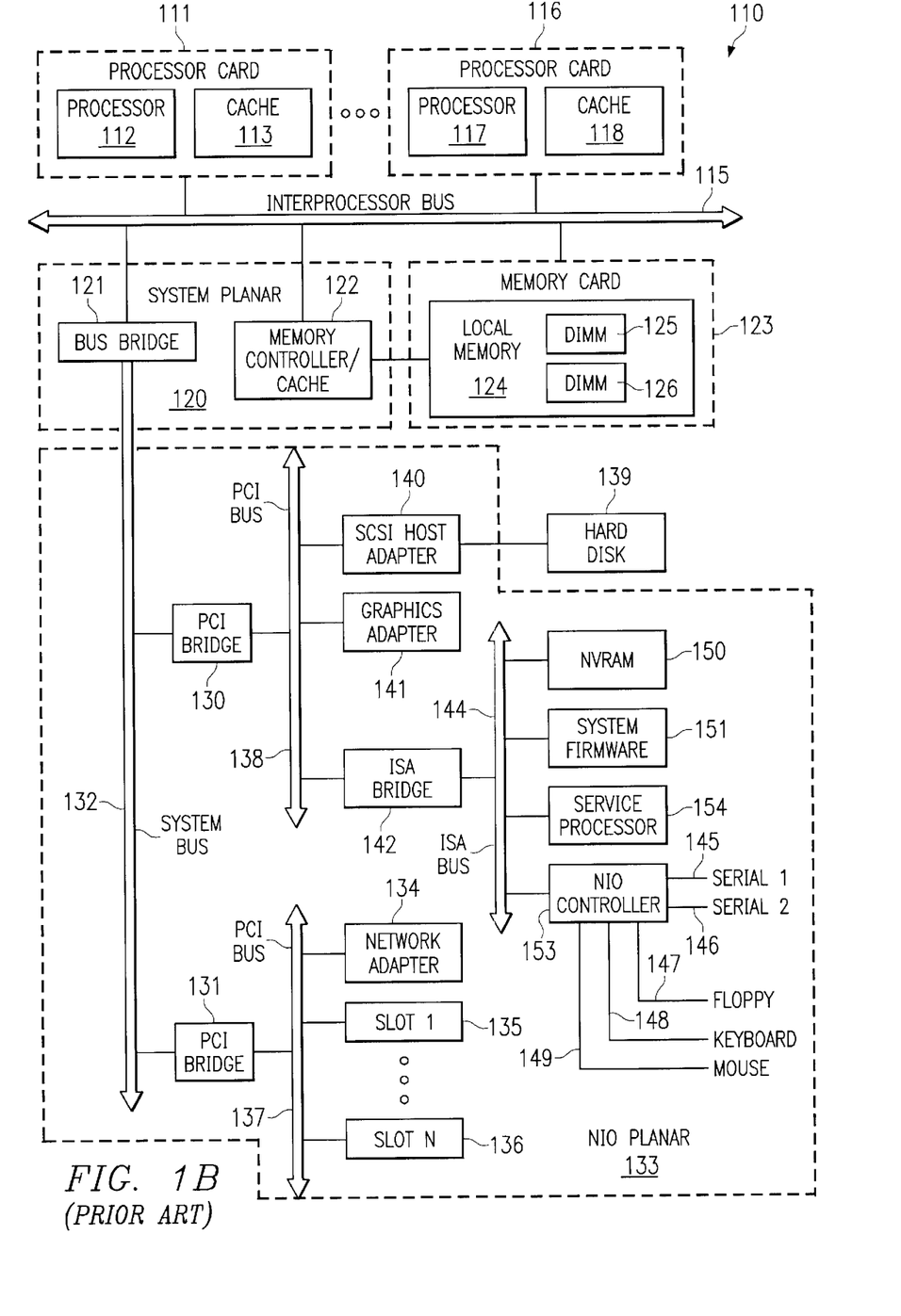
FIG. 1B depicts a prior art computer architecture that may be used within a client or server in which the present invention may be implemented.

With reference now to FIG. 1B, a diagram depicts a typical computer architecture that may be used within a client or server, such as those shown in FIG. 1A, in which the present invention may be implemented. Data processing system 110 employs a variety of bus structures and protocols. Processor card 111 contains processor 112 and L2 cache 113 that are connected to interprocessor bus 115. System 110 may contain a plurality of processor cards; processor card 116 contains processor 117 and L2 cache 118.

Interprocessor bus 115 supports system planar 120 that contains bus bridge 121 and memory controller 122 that supports memory card 123. Memory card 123 contains local memory 124 consisting of a plurality of dual in-line memory modules (DIMMs) 125 and 126.

Interprocessor bridge 121 connects to PCI bridges 130 and 131 via system bus 132. PCI bridges 130 and 131 are contained on native I/O (NIO) planar 133 which supports a variety of I/O components and interfaces. PCI bridge 131 provides connections for external data streams through network adapter 134 and a number of card slots 135–136 via PCI bus 137. PCI bridge 130 connects a variety of I/O devices via PCI bus 138. Hard disk 139 may be connected to SCSI host adapter 140, which is connected to PCI bus 138. Graphics adapter 141 may also be connected to PCI bus 138 as depicted, either directly or indirectly.

ISA bridge 142 connects to PCI bridge 130 via PCI bus 138. ISA bridge 142 provides interconnection capabilities through NIO controller 153 via ISA bus 144, such as serial connections 145 and 146. Floppy drive connection 147 provides removable storage. Keyboard connection 148 and mouse connection 149 allow data processing system 110 to accept input data from a user.

Non-volatile RAM (NVRAM) 150 provides non-volatile memory for preserving certain types of data from system disruptions or system failures, such as power supply problems. System firmware 151 is also connected to ISA bus 144 and controls the initial BIOS. Service processor 154 is connected to ISA bus 144 and provides functionality for system diagnostics or system servicing.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention but rather provide information concerning the range of hardware platforms that may support the receipt and transmission of messages.

As shown in FIGS. 1A–1B, the present invention is contemplated as being able to be implemented on a variety of network topologies and hardware platforms. It is also contemplated that the present invention may be implemented within, or may be interfaced to, a variety of messaging systems supporting a variety of messaging protocols.

In the following description, an "outgoing" message is a message that originates at a sender and is transmitted by an originating message system. The term "outgoing" is used to describe the origin of the message and its original direction of travel; a copy of an outgoing message or other data associated with an outgoing message may be stored in a data processing system, even though the original message may have already been transmitted to its intended recipients. An "original" message is a message authored by a sender and addressed to one or more recipients; an original message may be replicated so that unique copies of the original message can be transmitted to each intended recipient, which may require minor modification of headers to ensure that a copy of the original message is uniquely addressed to a single recipient.

As noted previously, it is trivial to determine the delivery status of a single message if it has only one recipient. Once a message has multiple recipients and transfers through multiple mail transfer agents with different mailing protocols, though, it may be quite difficult for the originator of a message to compile multiple return receipts for several original messages, reconcile the return receipts with their originating message, and determine the extent to which an original message was successfully delivered to its intended recipients. Hence, a methodology is required for properly computing the delivery status of the message based upon the delivery receipts, i.e. the delivery status notification (DSN) messages. The present invention provides a methodology for computing the message status in such cases. Although the present invention may be implemented over a variety of message protocols, prior to discussing the methodology in more detail, some relevant information is provided on the operation of standard Internet message protocols.

SMTP (Simple Mail Transfer Protocol) is the most commonly used protocol for sending messages on the Internet. The SMTP protocol requires that an SMTP server provides delivery failure notification if it determines that a message cannot be delivered to one or more recipients. Such notification consists of an ordinary Internet mail message explaining the error and at least the headers of the failed message. However, actual experience with large mail distribution lists indicated that such messages are often insufficient to diagnose delivery problems. In addition, the lack of a standardized format for delivery notifications in Internet mail makes it difficult to exchange such notifications with other message handling systems. Hence, a need existed for a standardized and comprehensive procedure for a delivery status notification in Internet mail.

In an attempt to provide such a procedure, the Internet Engineering Task Force (IETF) promulgated RFCs (Requests for Comments) 1891–1894 to define extensions to the SMTP protocol that allow an SMTP client to request that an SMTP server issue or not issue a DSN under certain conditions. RFCs 1891–1894 extend the Simple Mail Transfer Protocol service defined in the older IETF RFCs 821–822. The extended protocol is referred to as the Extended Simple Message Transfer Protocol (ESMTP). More information concerning these RFCs can be found in the following publications available from the IETF at http://www.ietf.org: Moore, K., "SMTP Service Extension for Delivery Status Notifications", IETF RFC 1891, January 1996; Vaudreuil G., "The Multipart/Report Content Type for the Reporting of Mail System Administrative Messages", IETF RFC 1892, January 1996; Vaudreuil, G., "Enhanced Mail System Status Codes", IETF RFC 1893, January 1996; Moore, K., and G. Vaudreuil, "An Extensible Message Format Delivery Status Notifications", IETF RFC 1894, January 1996; Postel, J., "Simple Mail Transfer Protocol", IETF RFC 821, August 1982; and Crocker, D., "Standard for the Format of ARPA Internet Text Messages", IETF RFC 822, August 1982.

With the ESMTP extensions, SMTP clients can now specify: whether a DSN should be generated under certain conditions; whether notifications should return the contents of the message; and whether additional information should be returned with a DSN that allows the sender to identify the name of the recipient and the transaction path.

In order to start a session or mail transaction in SMTP, the command "HELO" is used with the following syntax: "HELO username". In ESMTP, a new command "EHLO" is defined to replace the command "HELO" and has the following syntax: "EHLO username". If an SMTP mail server replies to an "EHLO" command with acceptance, then the mail client determines that the mail server is ESMTP-enabled and is so-called DSN-conformant. In other words, the acceptance response to the "EHLO" command allows the connecting ESMTP sender to determine that the ESMTP server supports the functionality of DSN.

Figure 2A:
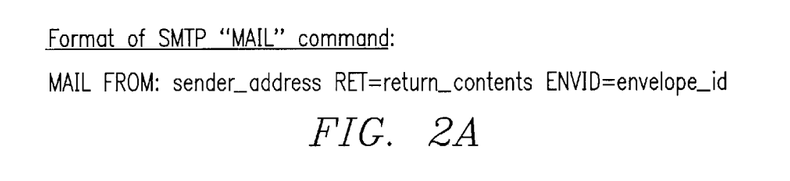
FIGS. 2A–2G show the syntax and acceptable parameter values of some SMTP and ESMTP commands and an example of an ESMTP delivery notification in accordance with a preferred embodiment of the present invention.
Figure 2B:
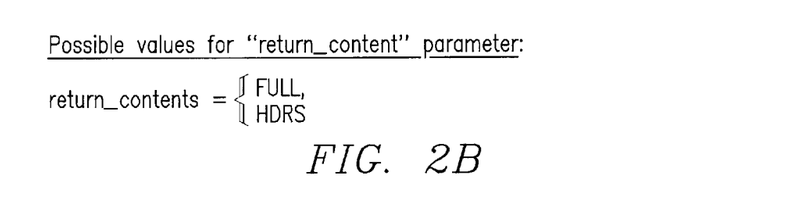

In SMTP, the command "MAIL" has an argument "FROM", which is used as "MAIL FROM: sender_address" and specifies the mail sender's address. In ESMTP, this command is expanded as shown in FIG. 2A. The variable "return_contents" specifies whether the full content or only the headers of a mail message should be returned within a DSN. The possible values for the "return_contents" variable are defined as shown in FIG. 2B.

Figure 2C:
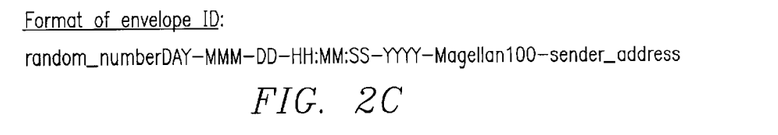
Figure 2D:
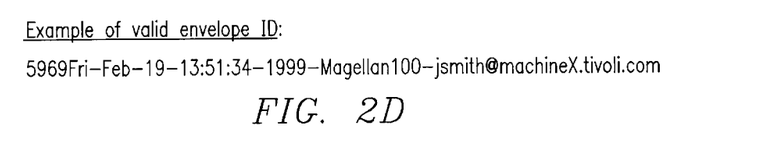

The variable "envelope_id" is used to specify an "envelope identifier" to be transmitted along with the message and included in any DSNs issued for any of the recipients named in this particular SMTP transaction. The purpose of the envelope identifier is to allow the sender of a message to identify the transaction for which the DSN was issued. In the present invention, the unique identification of an individual e-mail message notification is defined as shown in FIG. 2C. For instance, the envelope identification shown in FIG. 2D is valid.

Figure 2E:
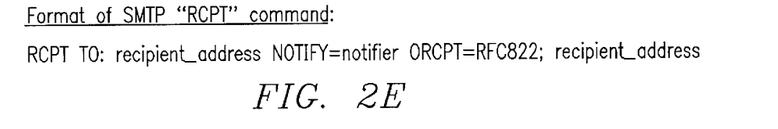
Figure 2F:
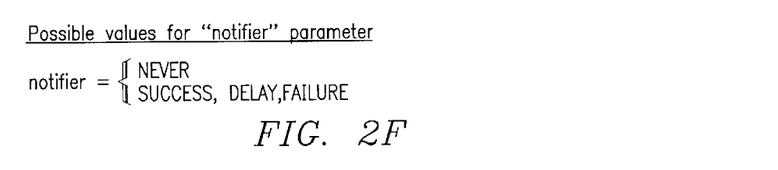

In SMTP, the command "RCPT" has an argument "TO" which is used as "RCPT TO: recipient_address" and specifies the mail recipient's address. In ESMTP, this command is expanded as shown in FIG. 2E. The variable "notifier" specifies which kind of DSN that the mail transfer agent should provide. The possible values for the "notifier" variable are defined as shown in FIG. 2F. In the present invention, the case "notifier=NEVER" is not of interest.

The ESMTP keyword "ORCPT" provides a way to specify the original recipient address that will be returned in a DSN. This information is rather important when a message passes through multiple mail transfer agents with different protocols due to the fact that the original recipient address may not be the same as the final recipient address.

The format of a DSN defined by IETF RFCs 1891–1894 is a multipart Multipurpose Internet Mail Extension (MIME) report. The first and second parts contain the delivery information. More precisely, the first part is for human reading, and the second part is for machine parsing. The third part is the mail transfer path and the original mail contents, if "return_contents=FULL", or just the mail headers, if "return_contents=HDRS."

Figure 2G:
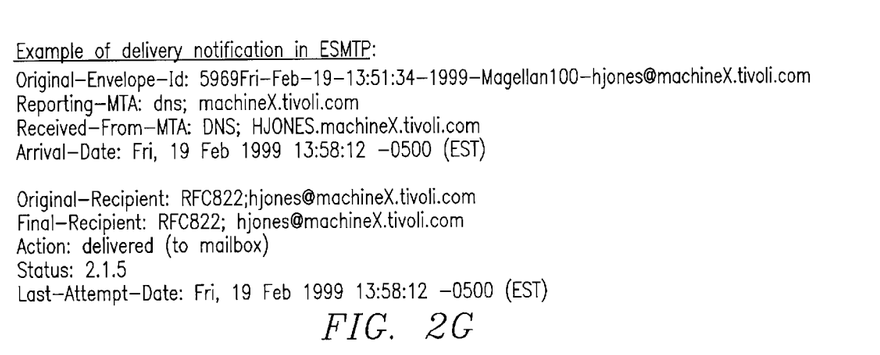

To develop a mail application that can automatically update the delivery status of outgoing mail messages, the second part of the MIME report is examined. The format of this part has been rigorously defined in IETF RFC 1894 for machine reading, an example of which is shown in FIG. 2G.

In the present invention, the strings after keywords "Original-Envelope-Id", "Arrival-Date", "Original-Recipient", and "Status" are extracted from the DSN and stored in a data structure which summarizes the incoming mail. The values of "Status" vary from "2.x.x" (success), to "4.x.x" (delay), to "5.x.x" (failure), and the second and third digits specify the reason for the mail delivery status, as is defined in the ESMTP standard.

The present invention provides a methodology for determining a message delivery status over multiple recipients and multiple message protocols for a unique outgoing message. As explained in more detail further below, a variety of protocols may be supported, such as Messaging Application Programming Interface (MAPI), Vendor Independent Messaging (VIM), and ESMTP, previously described above. However, prior to discussing the present invention with respect to multiple protocols, an explanation is provided for computing a single delivery notification status for an original, outgoing message sent to multiple recipients.

In order to determine a delivery notification status over multiple recipients, several variables associated with a messaging system must be tracked with respect to the original message. These variables may include: the time period during which a message is generated and its associated responses are expected; and the set of recipients, which may include multiple recipient lists, such as a "TO:" list for direct recipients, a "CC:" list for "carbon-copied" recipients, and a "BCC:" list for "blind-carbon-copied" recipients.

The delivery status value of a particular message that was sent to multiple recipients depends upon the delivery status value reported in all incoming delivery status notifications (DSNs) returned or determined for all recipients of the particular message. In addition, the list of names of recipients compiled from a set of incoming DSNs needs to match the possible recipient lists ("TO:", "CC:", and/or "BCC:") that constituted the set of recipients that received the particular message.

In other words, there should be a one-to-one correspondence between the names of the recipients in the incoming DSNs and the names of the recipients that were to receive the original message; an incoming DSN should not contain a name of a recipient that was not in the original message, although a DSN might never be received from an intended recipient. Also, the multiple status values for the set of recipients should map in a many-to-one manner to the final delivery status for a particular message.

Each incoming DSN contains an envelope identifier uniquely identifying the DSN's associated, original, outgoing message, and each DSN also contains the name of an originally intended recipient. The data processing system can also capture an arrival time for the DSN. Using the envelope identifier, the original recipient identifier, and the arrival time, these values can be used to compute a delivery status for a particular, original message that was previously transmitted as an outgoing message.

Figure 3:
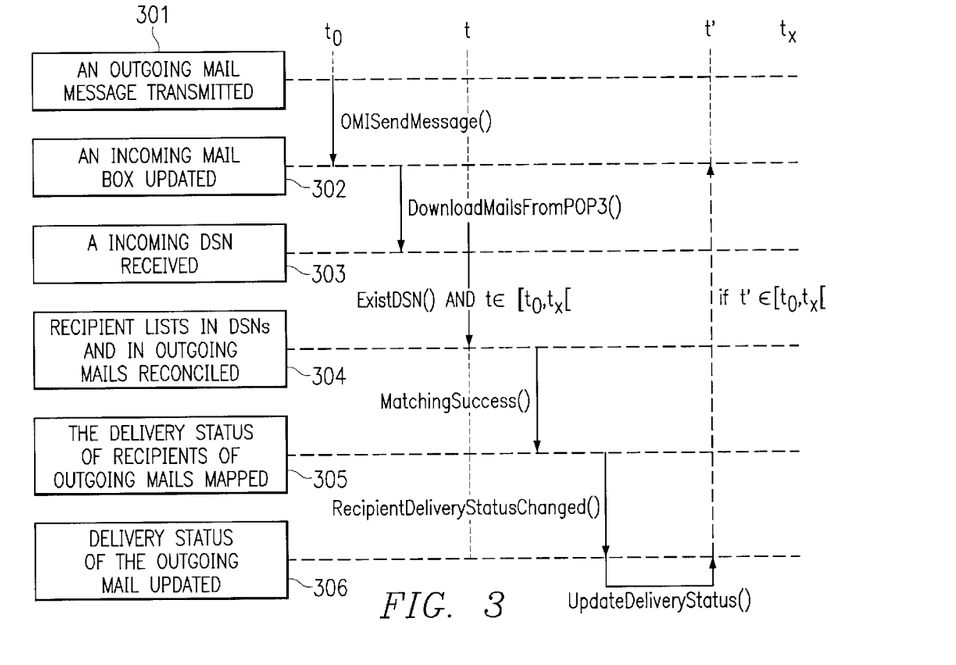
FIG. 3 is a sequence diagram depicting a process for computing a delivery status for an outgoing message in accordance with a preferred embodiment of the present invention.

With reference now to FIG. 3, a sequence diagram depicts a process for computing a delivery status for an outgoing message in accordance with a preferred embodiment of the present invention. In the diagram, a time dimension is shown with time increasing from left to right in the diagram, and a series of expected actions are shown as a series of steps from top to bottom in the diagram.

At step 301, i.e. at time $t_0$, an outgoing message is generated and successfully transmitted. At that moment, the value of the delivery status for the outgoing message is initialized to "Pending", and the status values for all recipients are also initialized to "Pending".

Each outgoing, original message is given a particular time period in which a DSN is expected from each recipient. In the diagram, the time period is shown as $[t_0, t_x[$. In other words, a DSN is expected before time=$t_x$ is reached. If a delivery status for an outgoing message is checked or computed after the expiration date/time of the particular outgoing message, and a DSN has not been received, then the delivery status for a particular recipient is marked as "Expired". In the preferred embodiment of the invention, the actual expiration time value for an original message may be individually set for each message in a variety of manners, such as setting it equal to a system default, setting it equal to a user-selected default, or allowing the sender to select a time expiration value for each outgoing message.

At step 302, the incoming mailbox of the sender is updated in some manner to reflect that an outgoing message was successfully transmitted. At step 303, an incoming DSN is received, e.g., by being downloaded from a mail server. At step 304, if the DSN was received in the time period that was expected for its associated outgoing mail message, the recipient identified in a DSN is reconciled with the recipient lists in the outgoing mail message.

At step 305, assuming that the DSN has been successfully matched with its associated original message, then the delivery status for the recipient identified by the incoming DSN is updated in the appropriate database or data structure. At step 306, the delivery status of the original message is updated or recomputed, which can be stored in association with other information concerning the original message. In this manner, the sender of the original message may query the current delivery status of original message.

As should be apparent, steps 303–306 may be repeated as often as necessary. As each DSN is received, the process shown in steps 303–306 is performed to extract the status for a particular recipient and to incorporate the received status into the appropriate database or data structure entry. At any given time, the sender may view the delivery status of the outgoing message. Alternatively, the status of each received DSN may be stored when received and then processed upon request by the sender or other user, i.e. the DSNs may be stored for subsequent processing only when specifically requested. After time $t_x$, the sender or other user may be informed through an appropriate indication that the delivery status of the original message is final because the time period for expecting any DSNs has expired.

In a preferred embodiment of the present invention, the computed delivery status of an original message, "Status", is defined over a set of possible status values that are protocol-neutral. The derivation of these protocol-neutral status codes is described in more detail further below. All possible values of delivery status of an outgoing message is defined in the set:

Status ∈ {Success Pending Delay Failure Expired}.

The statuses "Success", "Delay", and "Failure" are generally derived from similar, protocol-specific, status codes that are returned in a DSN. The status "Pending" is the initial status setting for a recipient at time to when the message is successfully transmitted. If the delivery status of the message is checked after its expired date/time predefined by its sender, denoted as $t_x$, its delivery status is set to "Expired". Therefore, the set of computed delivery statuses for an outgoing message may be partially derived from mapping actual, protocol-specific status codes in a particular message protocol to protocol-neutral status codes, as is described in more detail further below, and partially derived from temporal values and temporal actions as determined by the mail system that transmitted the original message for the sender.

Depending upon the implementation of the present invention, the set of protocol-neutral status values may vary and may include additional or fewer status values than described herein. Although the "Expired" status value connotes additional information about the reason why a message has failed to be delivered, the "Expired" status value can be merged with the "Failure" status code.

In computing the delivery status of an outgoing message, denoted as "Status", the possible protocol-neutral status values follow the priority order:

Status ∈ {Failure Delayed Pending Success} in which the statuses have a descending priority from left to right as shown.

Using the priority order noted above, at any given time t in $[t_0, t_x[$, the delivery status can be computed according to number of DSNs as follows:

$$Status = \begin{cases} Failure, & \text{if } \# \text{ failure} > 0 \text{ else} \\ Delay, & \text{if } \# \text{ delayed} > 0 \text{ else} \\ Pending, & \text{if } \# \text{ pending} > 0 \text{ else} \\ Success, & \text{if } \# \text{ success} > 0. \end{cases}$$

The number of failed, delayed, pending, and successful DSNs before a given time t is denoted as "#failure", "#delayed", "#pending", and "#success", respectively. The sum of these numbers is identical to the sum of the number of recipients in the recipient lists, i.e. the "TO:", "CC:", and "BCC:" lists, for a given outgoing message.

Each recipient of an outgoing message has an associated status value that changes according to a DSN or according to a time period that expired while waiting for a DSN from the recipient. Each received DSN contains some type of protocol-specific status associated with it according to the protocol that was used to return the DSN. As previously mentioned, the protocol-specific status codes of multiple message protocols must be mapped to a protocol-neutral set of status codes that can be commonly applied to any implementation of the present invention.

In the Internet e-mail protocol ESMTP, the delivery status codes vary from "2.x.x" indicating successful delivery, to "4.x.x" indicating delayed delivery, to "5.x.x" indicating failed delivery. The second and third digits specify reason codes for the mail delivery status code. These reason codes generally allow network engineers and system analysts to diagnose delivery failures. However, the reason codes are not further handled by the present invention.

Figure 4:
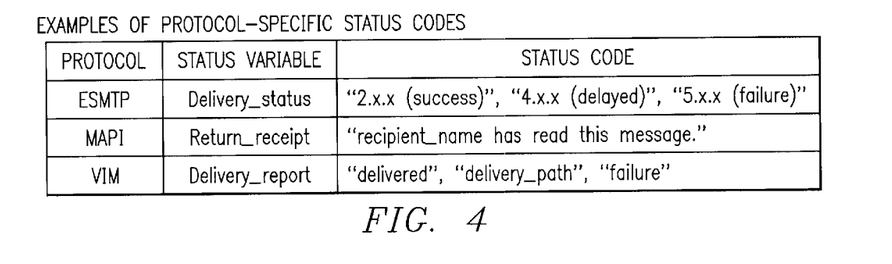
FIG. 4 is a table representing an example containing sets of protocol-specific delivery status codes.

With reference now to FIG. 4, a table represents an example containing sets of protocol-specific delivery status codes. The table shows three protocols, ESMTP, MAPI, and VIM, the status variables in the DSN in which a status code may be found, and the possible meanings for the status codes.

Figure 5:
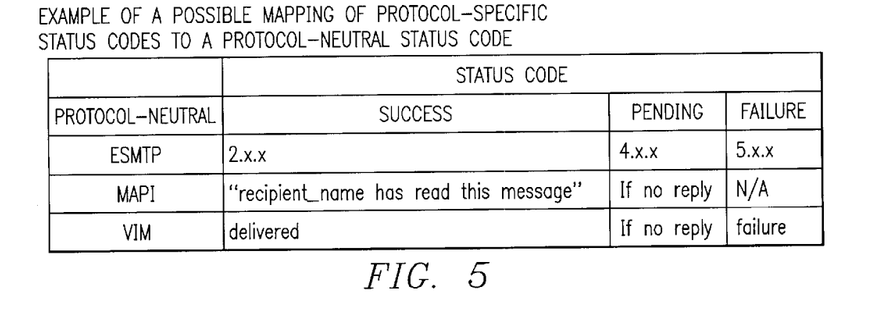
FIG. 5 is a table representing an example of a mapping from protocol-specific delivery status codes to a protocol-neutral set of status codes in accordance with a preferred embodiment of the present invention.

With reference now to FIG. 5, a table represents an example of a possible mapping from protocol-specific delivery status codes to a protocol-neutral set of status codes in accordance with a preferred embodiment of the present invention. A set of protocol-neutral status codes allow protocol-specific status codes from multiple protocols to be mapped to a single, common set of status codes.

The particular set of protocol-neutral status codes may vary depending upon the implementation, but in general, the set of protocol-neutral status codes would be chosen in a manner that allows a correlation with the protocol-specific status codes that are being supported in the particular implementation. In this particular exemplary implementation, since only a single protocol (ESMTP) has a specific status code "Delayed", in order to further simplify the set of protocol-neutral status codes, the "Delayed" status code that was previously discussed above is merged into the "Pending" status code.

To restate the previously described computation method for the particular implementation shown in FIG. 5, the delivery status of an outgoing message, denoted as "Status", has the following protocol-neutral status values in the priority order:

Status ∈ {Failure Pending Success}.

Using the priority order noted above, at any given time t in $[t_0, t_x[$, the delivery status for the implementation shown in FIG. 5 can be computed according to number of DSNs as follows:

$$Status = \begin{cases} Failure, & \text{if } \# \text{ failure} > 0 \text{ else} \\ Pending, & \text{if } \# \text{ pending} > 0 \text{ else} \\ Success, & \text{if } \# \text{ success} > 0. \end{cases}$$

Figure 6:
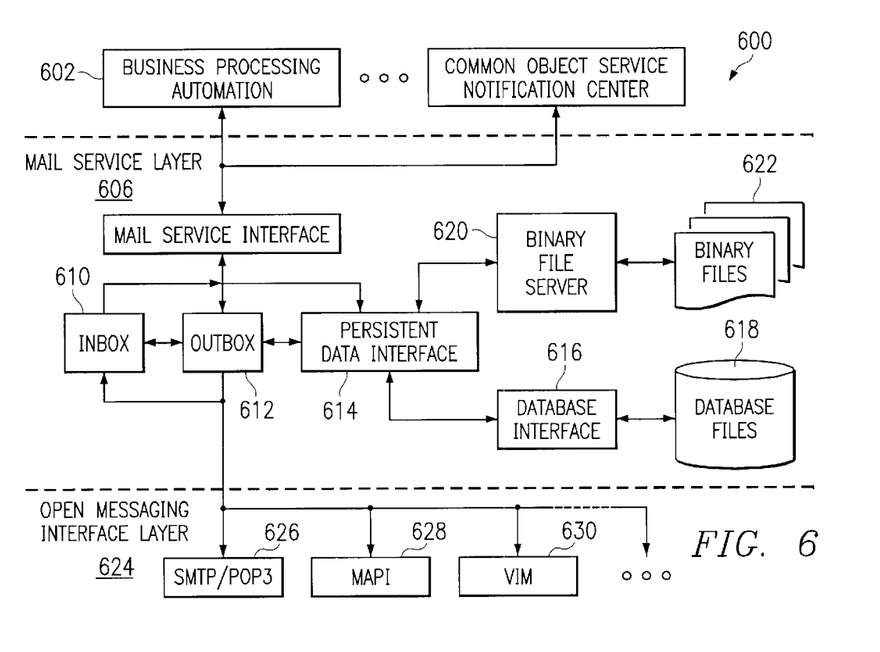
FIG. 6 is a block diagram depicting a mail service system in which the present invention may be implemented.

With reference now to FIG. 6, a block diagram depicts a mail service system in which the present invention may be implemented. Mail service system 600 performs various workflow activities related to the processing of mail messages for other enterprise-related software, such as business processing automation component 602 and common object service notification center 604. Specifically, the present invention may be embedded within mail service layer 606 as part of mail service interface 608. The mail service interface component is invoked as needed by other software components, which is expected to include a message application that accepts inputs from a user to author messages. Mail service interface 608 controls the flow of data between other software components and the mail system components that interface with other data processing systems. Mail service interface 608 may contain the rules and tables required to map various protocol-specific delivery status codes to a single set of protocol-neutral delivery status codes, as described previously with respect to FIGS. 3–5.

Mail service interface 608 stores the data into specific data structures, such as inbox 610 and outbox 612, and interfaces with persistent data interface 614, which permanently stores data in various locations as necessary. Persistent data interface 614 may use database interface 616 to store some data in database files 618 and may use binary file server 620 to permanently store binary files 622, which may constitute media files for use as attachments to mail messages. Other manners of storing and accessing data may be implemented as necessary.

Mail service interface 608 also interfaces with open messaging interface components 624, which contains the intelligence necessary for sending and receiving messages in a variety of message protocols, as is well-known in the art. If MAPI or VIM protocol is selected, then the corresponding delivery reporting functionality, e.g. "returnReceipt" in MAPI, is set to true.

With the ESMTP protocol, the command "EHLO" will first be tried. If the ESMTP command "EHLO" fails, then the SMTP command "HELO" will be tried. Assuming that the SMTP command "HELO" is successful, then the message was successfully transmitted. In this case, a DSN will not be returned, in which case the time period for that particular recipient will eventually expire and be set to the appropriate status code, such as "Failure". Although a message may have been successfully transmitted yet marked with failed status, ESMTP is becoming a popular protocol and is expected to eventually replace SMTP, thereby obviating this type of problem.

When a new message is ready to be sent, mail service interface 608 will connect to open messaging interface layer 624 to send the message, which may include sending the message or one or more copies of the message through the Internet or other networks. Each outgoing, original message is issued a unique envelope identifier, which is replicated in the copies of the message if the message is sent to multiple recipients. Once a message is successfully transmitted, the delivery status of the outgoing message is initialized, and the delivery status and other associated information is stored appropriately.

Figure 7:
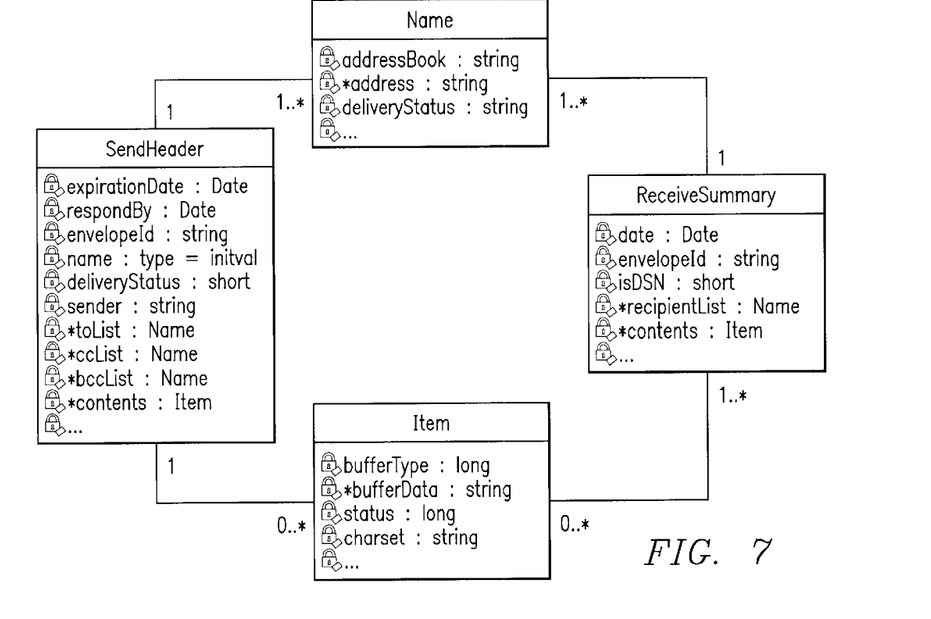
FIG. 7 is a figure depicting a schema of classes and their relationships to model the outgoing and incoming delivery status notifications in accordance with a preferred embodiment of the present invention.

With reference now to FIG. 7, this figure shows a schema of classes and their relationships to model the outgoing and incoming delivery status notifications in accordance with a preferred embodiment of the present invention. In the figure, the classes have been simplified in order to highlight the attributes related to the DSN functionality. The "deliverystatus" of an outgoing message represented in an instance of "SendHeader" is calculated based on the "deliverystatus" of all recipients in "toList", "ccList" and "bccList" represented by instances of "Name". The "deliverystatus" of each recipient is, in turn, updated based on the incoming DSNs represented by instances of "ReceiveSummary". The length of "recipientList" of a "ReceiveSummary" may increase over time until a response has been received from all recipients or the expiration date/time has passed. The contents of incoming mail are a list of MIME type items. Only one copy of these items is persisted.

With reference now to FIGS. 8A–8E, window snapshots depict a user interface in which messages and their associated overall protocol-neutral delivery status are presented to the user in accordance with a preferred embodiment of the present invention. FIGS. 8A–8E can be viewed as a series of window snapshots that follow a series of user input or user actions as the user interacts with the user interface to obtain information concerning messages. Common reference numerals throughout the series of figures refer to common features in the figures.

Figure 8A:
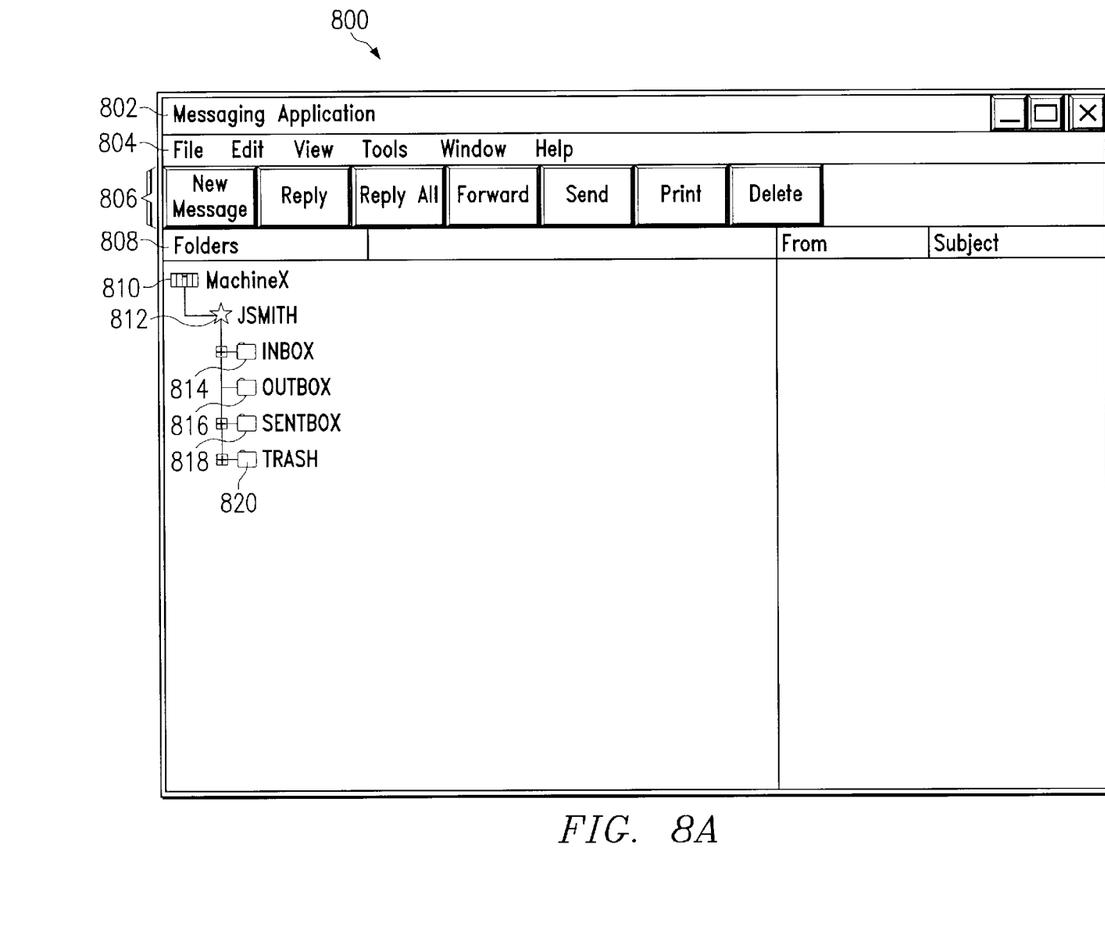
FIGS. 8A–8E are figures depicting a user interface in which messages and their associated overall protocol-neutral delivery status are presented to the user in accordance with a preferred embodiment of the present invention.

FIG. 8A is a window snapshot showing a set of message folders for a particular user. Window 800 is the main window for a messaging application that presents message information to a user and generally allows a user to interact with the messages, e.g., by allowing a user to create new voice messages, text messages, etc. The computation of a protocol-neutral status, as described in detail above, may be embedded within the messaging application. Alternatively, the delivery status computations may be performed elsewhere, such as a mail server, and the messaging application may merely represent an interface between a user and a mail server or mail database. Title bar 802 shows the name of the application, and menu bar 804 contains various menus from which the user may select various processing actions. Speed bar 806 allows a user to quickly invoke commonly used mail functions without using menu bar 804. Status bar 808 contains column headers or column titles and other status information.

In a large corporation, a user may have the option of connecting to the corporation's message service through a variety of message servers, or the user may be geographically constrained to connecting to the message service through the most local message server. Server identifier 810 shows that the user is connected to the message service through a message server with a name "MachineX". User identifier 812 shows that user "JSMITH" is using the messaging application and is connected to the message server.

Folders 814–820 contain messages in various states of processing. Inbox 814 contains a plurality of incoming messages directed to the user. Outbox 816 would contain messages originating with the user yet waiting to be sent to recipients, although in this example, outbox 816 is empty. Sentbox 818 contains messages that have been sent by the user, and trash folder 820 holds messages that have been trashed or deleted by the user but not yet wiped from the system.

Figure 8B:
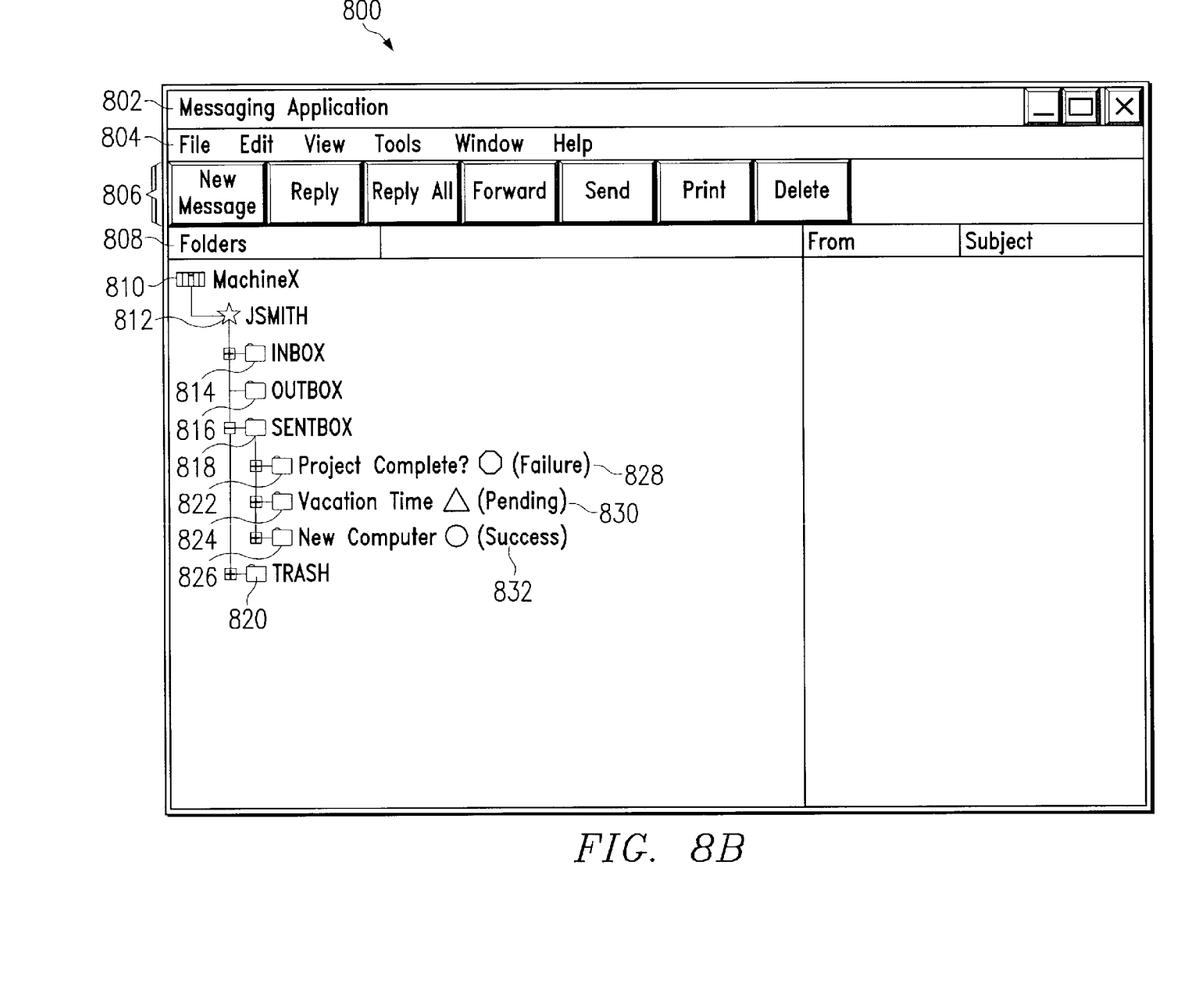

FIG. 8B depicts window 800 after the user has requested to expand sentbox 818 to view the contents of sentbox 818. In this example, sentbox 818 contains three messages 822–824 that have been sent by the user at some previous point in time. In the prior art, most message applications merely list the sent messages and allow the user to open the sent message to view the contents of the sent messages. In this example, each message is uniquely identified by displaying its subject line or a portion of its subject line.

In the present invention, the user not only may view the contents of messages that were previously sent but also may view the current overall delivery status of a message. Overall delivery status indicators 828–832 allow the user to quickly determine whether or not a message has been successfully delivered to all intended recipients. In this example, message 822 has failure indicator 828, message 824 has pending indicator 830, and message 826 has success indicator 832. The type of visual information provided by an overall delivery status indicator may vary depending upon system implementation, e.g., a special icon may be associated with each type of protocol-neutral status supported by the system. Text labels may also be used with each message. In a manner that is well known in the art, colors may be displayed to provide additional visual information to the user. In this example, in addition to labeling each message, the following icons are used: a stop icon is associated with a message that has failed to be delivered to each intended recipient; a yield icon is associated with a message that has yet to be successfully delivered to each intended recipient yet has not received a protocol-specific failure status code from any intended recipients; and a proceed icon is shown for a message that was successfully delivered to all intended recipients.

Figure 8C:
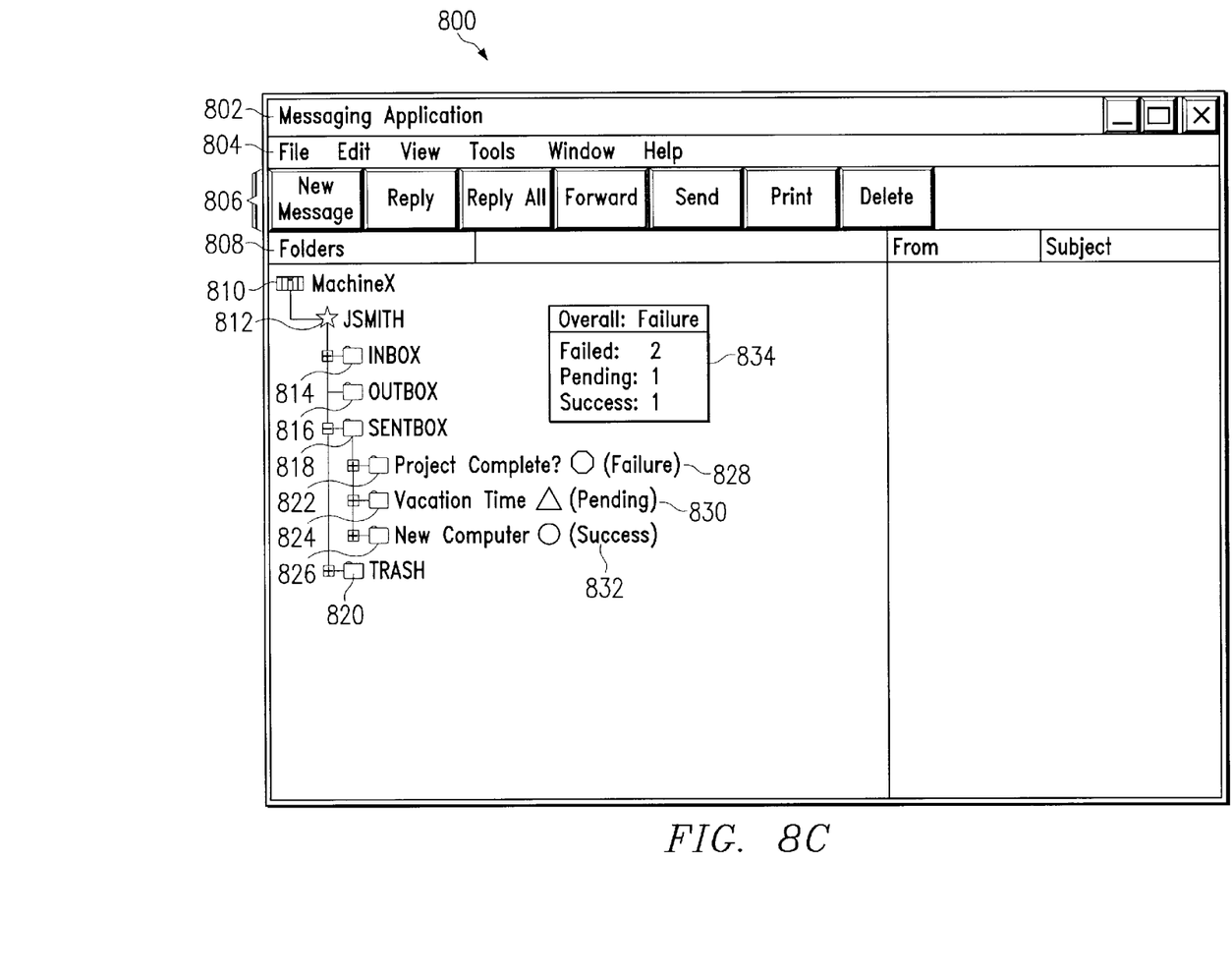

FIG. 8C shows information box 834 being presented to a user after the user has requested to view additional information about message 822, e.g., by right-clicking a button on a mouse or other input device while a cursor is over the message. Information box 834 shows a total count for each status type determined from the set of recipients for message 822, from which the user may understand that the message has a protocol-neutral failure status because the message failed on delivery to two recipients.

Figure 8D:
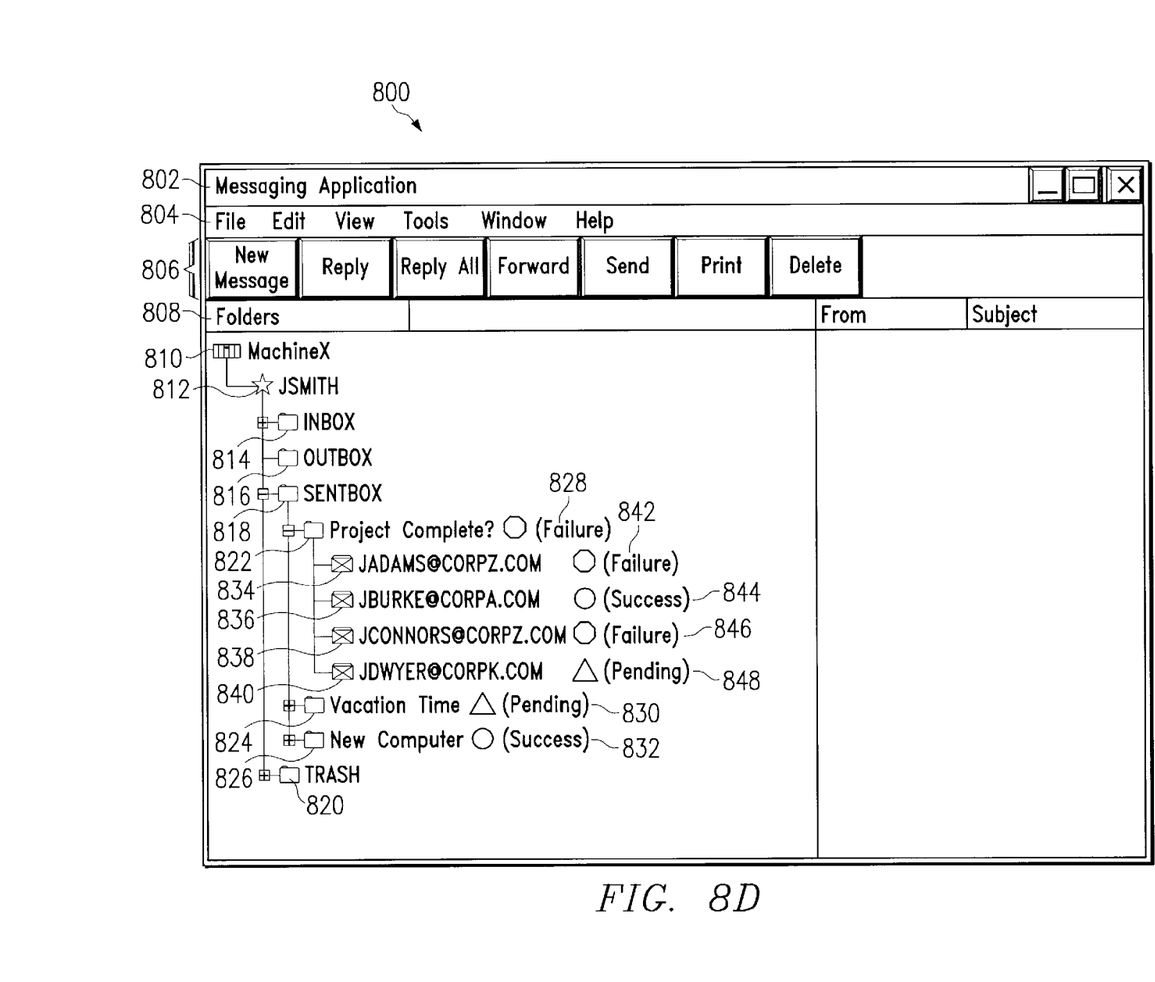

FIG. 8D depicts window 800 after the user has requested to expand message 822 to view the delivery status for each intended recipient. In this example, message 822 has four intended recipients 834-840 that were listed in the message's "TO:" recipient list or other type of recipient list. In the prior art, most message applications allow a user to see the address of the recipient and/or the nickname of the recipient. In this example, each recipient is uniquely identified by displaying its e-mail address, although other types of address information, such as phone number, could be shown depending upon the type of messages or the type of messaging application.

The delivery status for each recipient is also indicated by individual delivery status indicators, and in this example, individual delivery status indicators 842-848 are associated with intended recipients 834-840, respectively. These indicators are similar to the overall delivery status indicators. However, the type and format of the information that is displayed to a user may vary depending upon system implementation. In this case, the protocol-neutral status for an intended recipient is shown, although a protocol-specific status for the intended recipient could be shown before the protocol-specific status is mapped to a protocol-neutral status.

Figure 8E:
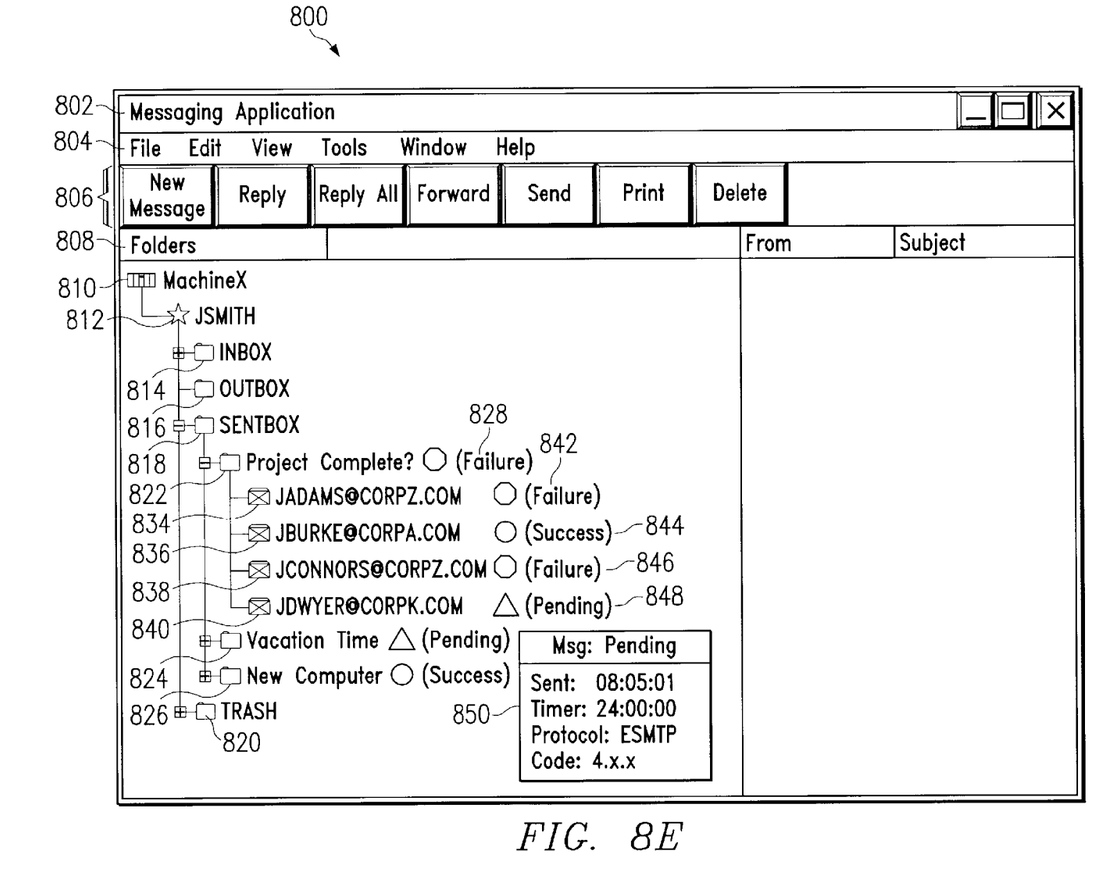

FIG. 8E shows information box 850 being presented to a user after the user has requested to view additional information about intended recipient 840, e.g., by right-clicking a button on a mouse or other input device while a cursor is over the intended recipient indicator. Information box 850 shows whatever information may be useful to the user to understand why the intended recipient has a pending status. In this case, the user may understand that the intended recipient has a protocol-neutral pending status because the message has received a protocol-specific (ESMTP) delayed status code in a delivery status notification. The user also sees what time and/or date that the original outgoing message was sent, and the user may also see that a 24 hour timer was placed on the original outgoing message, thereby placing a limit on the time period for which the system will wait for a successful delivery status notification from the mail system of the intended recipient before marking the intended recipient with a failed status.

The advantages of the present invention should be apparent in view of the detailed description of the invention that is provided above. The present invention provides a method and system for the determination of a single delivery status of a message sent to multiple recipients which allows the message to be transmitted or transferred through multiple message protocols. The protocol-specific status codes of multiple message protocols are mapped to a protocol-neutral set of status codes that can be commonly applied to any implementation of the present invention.

It is important to note that while the present invention has been described in the context of a fully functioning data processing system, those of ordinary skill in the art will appreciate that the processes of the present invention are capable of being distributed in the form of a computer readable medium of instructions and a variety of other forms and that the present invention applies equally regardless of the particular type of signal bearing media actually used to carry out the distribution. Examples of computer readable media include media such as EPROM, ROM, tape, paper, floppy disc, hard disk drive, RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing messages in a data processing system, the method comprising:
   receiving a delivery status notification from at least one recipient of a modified copy of an original message, wherein the delivery status notification comprises a protocol-specific delivery status code;
   mapping the protocol-specific delivery status code to a protocol-neutral delivery status code; and
   computing a overall protocol-neutral delivery status code for the original message based upon protocol-neutral status codes for a plurality of delivery status notifications received from a plurality of recipients of modified copies of the original message.

2. The method of claim 1 further comprising, prior to receiving the delivery status notification:
   receiving an original message, wherein the original message originates at a sender and indicates a plurality of recipients;
   associating an envelope identifier with the original message; and
   attempting to transmit a modified copy of the original message with the envelope identifier to each indicated recipient using a messaging protocol.

3. The method of claim 2 wherein a modified copy of the original message is transmitted after a selection between a first messaging protocol or a second messaging protocol.

4. The method of claim 2 wherein at least one modified copy of the original message is transmitted using a first messaging protocol and at least one modified copy of the original message is transmitted using a second messaging protocol.

5. The method of claim 4 wherein the first messaging protocol is Extended Simple Message Transfer Protocol (ESMTP).

6. The method of claim 4 wherein the second messaging protocol is Messaging Application Programming Interface (MAPI).

7. The method of claim 4 wherein the second messaging protocol is Vendor Independent Messaging (VIM).

8. The method of claim 2 further comprising:
   initializing the overall protocol-neutral delivery status code of the original message to a pending status code.

9. The method of claim 2 further comprising:
   monitoring a time period for receipt of delivery status notifications associated with the original message; and
   setting the overall protocol-neutral delivery status code of the original message to a failed status code if the time period passes without receiving a delivery status notification from an intended recipient of the original message.

10. The method of claim 1, wherein the step of computing the overall protocol-neutral delivery status code further comprises:
    determining a total number of received delivery status notifications or pending delivery status notifications for each status code class in a set of protocol-neutral delivery status codes, wherein each class of status code in the set of protocol-neutral delivery status codes has a given priority; and selecting the overall protocol-neutral delivery status code as a status code class of highest priority with at least one received delivery status notification or with at least one pending delivery status notification.

11. The method of claim 1 further comprising:

presenting the overall protocol-neutral delivery status code of the original message to a user.

12. The method of claim 1 further comprising:

presenting to a user a protocol-neutral delivery status code for each intended recipient of the original message.

13. A data processing system for processing messages comprising:

first receiving means for receiving a delivery status notification from at least one recipient of a modified copy of an original message, wherein the delivery status notification comprises a protocol-specific delivery status code;

mapping means for mapping the protocol-specific delivery status code to a protocol-neutral delivery status code; and computing means for computing a overall protocol-neutral delivery status code for the original message based upon protocol-neutral status codes for a plurality of delivery status notifications received from a plurality of recipients of modified copies of the original message.

14. The data processing system of claim 13 further comprising:

second receiving means for receiving an original messages, wherein the original message originates at a sender and indicates a plurality of recipients;

associating means for associating an envelope identifier with the original message; and transmitting means for transmitting a modified copy of the original message with the envelope identifier to each indicated recipient using a messaging protocol.

15. The data processing system of claim 14 wherein a modified copy of the original message is transmitted after a selection between a first messaging protocol or a second messaging protocol.

16. The data processing system of claim 14 wherein at least one modified copy of the original message is transmitted using a first messaging protocol and at least one modified copy of the original message is transmitted using a second messaging protocol.

17. The data processing system of claim 16 wherein the first messaging protocol is Extended Simple Message Transfer Protocol (ESMTP).

18. The data processing system of claim 16 wherein the second messaging protocol is Messaging Application Programming Interface (MAPI).

19. The data processing system of claim 16 wherein the second messaging protocol is Vendor Independent Messaging (VIM).

20. The data processing system of claim 14 further comprising:

initializing means for initializing the overall protocol-neutral delivery status code of the original message to a pending status code.

21. The data processing system of claim 14 further comprising:

monitoring means for monitoring a time period for receipt of delivery status notifications associated with the original message; and setting means for setting the overall protocol-neutral delivery status code of the original message to a failed status code if the time period passes without receiving a delivery status notification from an intended recipient of the original message.

22. The data processing system of claim 13, wherein the computing means for computing the overall protocol-neutral delivery status code further comprises:

determining means for determining a total number of received delivery status notifications or pending delivery status notifications for each status code class in a set of protocol-neutral delivery status codes, wherein each class of status code in the set of protocol-neutral delivery status codes has a given priority; and selecting means for selecting the overall protocol-neutral delivery status code as a status code class of highest priority with at least one received delivery status notification has been received or with at least one pending delivery status notification.

23. The data processing system of claim 13 further comprising:

presenting means for presenting the overall protocol-neutral delivery status code of the original message to a user.

24. The data processing system of claim 13 further comprising:

presenting means for presenting to a user a protocol-neutral delivery status code for each intended recipient of the original message.

25. A computer program product in a computer readable medium for use in a data processing system for processing messages, the computer program product comprising:

instructions for receiving a delivery status notification from at least one recipient of a modified copy of an original message, wherein the delivery status notification comprises a protocol-specific delivery status code;

instructions for mapping the protocol-specific delivery status code to a protocol-neutral delivery status code; and instructions for computing a overall protocol-neutral delivery status code for the original message based upon protocol-neutral status codes for a plurality of delivery status notifications received from a plurality of recipients of modified copies of the original message.

26. The computer program product of claim 25 further comprising:

instructions for receiving an original message, wherein the original message originates at a sender and indicates a plurality of recipients;

instructions for associating an envelope identifier with the original message; and instructions for transmitting a modified copy of the original message with the envelope identifier to each indicated recipient using a messaging protocol.

27. The computer program product of claim 26 wherein a modified copy of the original message is transmitted after a selection between a first messaging protocol or a second messaging protocol.

28. The computer program product of claim 26 wherein at least one modified copy of the original message is transmitted using a first messaging protocol and at least one modified copy of the original message is transmitted using a second messaging protocol.

29. The computer program product of claim 28 wherein the first messaging protocol is Extended Simple Message Transfer Protocol (ESMTP).

30. The computer program product of claim 28 wherein the second messaging protocol is Messaging Application Programming Interface (MAPI).

31. The computer program product of claim 28 wherein the second messaging protocol is Vendor Independent Messaging (VIM).

32. The computer program product of claim 26 further comprising:
   instructions for initializing the overall protocol-neutral delivery status code of the original message to a pending status code.

33. The computer program product of claim 26 further comprising:
   instructions for monitoring a time period for receipt of delivery status notifications associated with the original message; and
   instructions for setting the overall protocol-neutral delivery status code of the original message to a failed status code if the time period passes without receiving a delivery status notification from an intended recipient of the original message.

34. The computer program product of claim 25, wherein the instructions for computing the overall protocol-neutral delivery status code further comprises:
   instructions for determining a total number of received delivery status notifications or pending delivery status notifications for each status code class in a set of protocol-neutral delivery status codes, wherein each class of status code in the set of protocol-neutral delivery status codes has a given priority; and
   instructions for selecting the overall protocol-neutral delivery status code as a status code class of highest priority with at least one received delivery status notification or with at least one pending delivery status notification.

35. The computer program product of claim 25 further comprising:
   instructions for presenting the overall protocol-neutral delivery status code of the original message to a user.

36. The computer program product of claim 25 further comprising:
   instructions for presenting to a user a protocol-neutral delivery status code for each intended recipient of the original message.

* * * * *